United States Patent
Pyle

[11] 3,979,165
[45] Sept. 7, 1976

[54] DRILL GUIDE

[76] Inventor: Arnold S. Pyle, 629 Marston, Glen Ellyn, Ill. 60137

[22] Filed: May 22, 1975

[21] Appl. No.: 579,952

[52] U.S. Cl. .................... 408/14; 408/110; 408/712
[51] Int. Cl.² ............... B23B 45/14; B23B 49/00
[58] Field of Search ............... 408/14, 112, 110, 95, 408/98, 712, 104

[56] References Cited
UNITED STATES PATENTS

| | | |
|---|---|---|
| 2,831,376 | 4/1958 | Daniels ........................ 408/112 X |
| 3,077,129 | 2/1963 | Casles ............................ 408/112 |
| 3,550,481 | 12/1970 | Jensen ........................ 408/112 UX |
| 3,679,320 | 7/1972 | Bohorquez ..................... 408/14 X |
| 3,746,460 | 7/1973 | Lipe ............................... 408/112 |

*Primary Examiner*—Leon Gilden
*Attorney, Agent, or Firm*—Alter and Weiss

[57] ABSTRACT

A drill guide intended as an accessory to a portable hand-held drill may be integrally or removably attached. The removable version is a separate unit, transferable from drill to drill. A drill guide foot contacts the stock to be drilled at an adjustable angle, while adjustable locknuts mounted on a spring-biased threaded rod accurately set the depth of the holes to be drilled.

29 Claims, 9 Drawing Figures

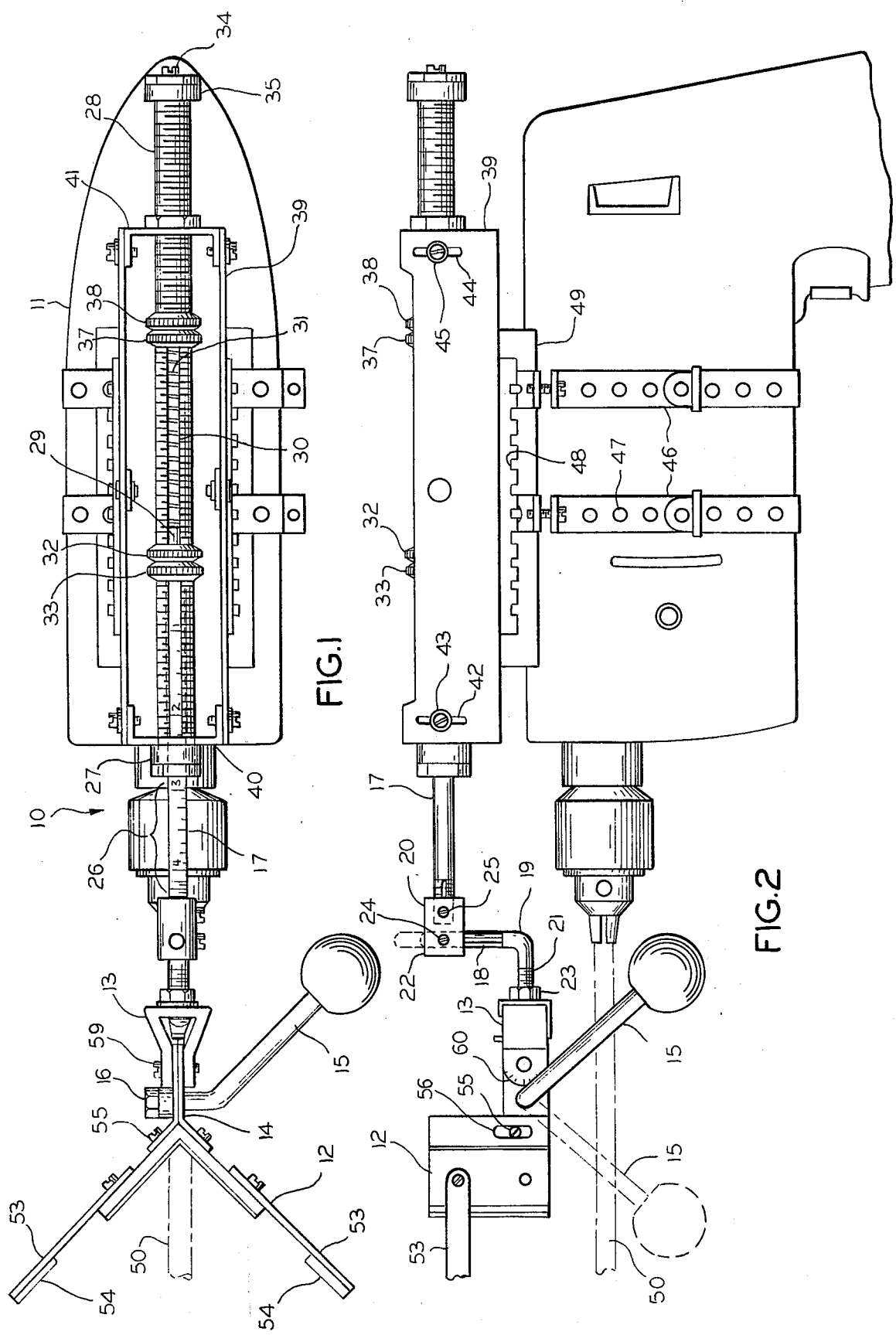

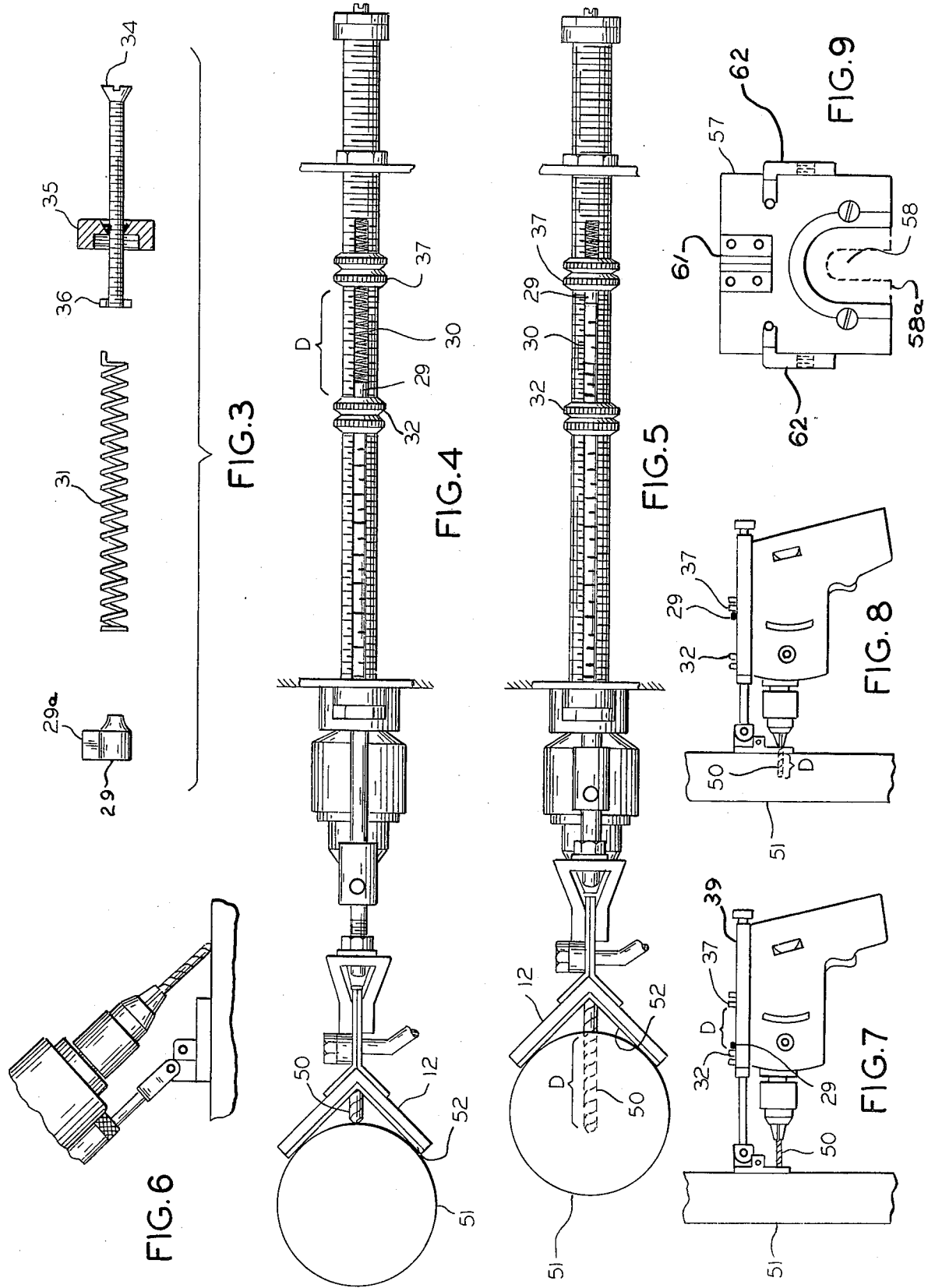

DRILL GUIDE

My invention relates generally to portable drill accessories and more particularly to drill guides for accurately drilling holes.

Users of portable hand-held drills find it difficult to perform a number of precision drilling operations such as accurately drilling holes of a desired depth, or drilling at a precise angle into a piece of stock. Heretofore, such operations required the use of a drill press, a piece of machinery not easily or often affordable by the average home hobbyist. However, even a drill press has its limitations. Large, irregularly-shaped pieces of stock sometimes cannot be accomodated by such a press. Neither can the drill press match the hand drill's portability and ease of transportation from job site to job site.

Previous attempts to design an adequate drill guide have not been successful. Several early designs featured depth gauges which functioned by actually contacting the stock when the desired depth was reached, thereby risking marring or damage to the stock. One of these devices was actually fitted to the drill bit, and as the bit turned, so too did the guide. This meant that the guide was rotating when it contacted the stock, a situation even more likely to produce nicks, gouges and scratches.

Another common failing among early drill guides was the lack of an accurate means to pre-set the desired depth to which a hole was to be drilled. Often, the guide had no depth scale, so pre-setting the hole depth involved using a separate measuring device. Guides which did include an integral depth scale often placed it in a location inconvenient for the drill operator to read. Some guides featured depth scales but offered no means to pre-set a stop once the desired depth was reached. This made it necessary for the drill operator to gauge by eye the movement of an indicator along a depth scale, an inherently inaccurate means of setting hole depth.

My invention has, therefore, the following objects:

To provide drill accessories enabling the accurate drilling of holes to a pre-set depth;

To provide such accessories enabling the drilling of holes at various angles to the stock being drilled;

To provide such accessories usable with curved as well as flat stock;

To provide such drill guide accessories for portable hand-held drills in universal versions removably fastenable to standard drills as well as in integral versions supplied with drills as a single unit.

The above-mentioned, and other objects and features of my invention, will become more apparent, and the invention itself will best be understood by reference to a preferred embodiment of the invention taken in conjunction with the accompanying drawings, in which:

FIG. 1 is a top view of my invention as installed on a portable hand-held drill;

FIG. 2 is a side view of the drill guide and drill shown in FIG. 1;

FIG. 3 is an exploded detail view of a spring assembly which is part of the drill guide;

FIG. 4 is s a top view of a drill guide and drill with the drill guide zero-adjusted to a piece of round stock;

FIG. 5 is a top view of the drill guide shown in FIG. 4 at the completion of the drilling operation;

FIG. 6 is a side view of the drill accessory adjusted to drill at a 45° angle;

FIG. 7 is a side view of a drill and drill guide zero-adjusted to a piece of flat stock;

FIG. 8 is a side view of the drill in FIG. 7 after completion of the drilling operation; and FIG. 9 is a top view of a guide foot to be used on flat stock.

Referring to FIG. 1, the numeral 10 refers generally to a drill guide removably affixed to a portable hand-held drill 11. The stock to be drilled is contacted by guide foot 12 pivotally fastened to mounting bracket 13 by swivel bracket 14. Handle 15 is provided for increased stability during drilling operations and is removably secured to swivel bracket 14 by nut 16. As shown in FIG. 2, handle 15 is pivotally adjustable and may even be removed and placed on the opposite side of swivel bracket 14 to accommodate a left-handed drill operator.

Mounting bracket 13 is adjustably joined to guide shaft 17 by offset unit 18 comprising offset elbow 19 threadably joined to offset extension 20. Offset elbow 19 is threaded at end 21. It may also be threaded at end 22, however, preferably it slip fits into offset extension 20. When threaded into mounting bracket 13 and slip fitted into offset extension 20, as shown in FIG. 2, the offset elbow is secured in place by locknut 23 and set screw 24, respectively. Offset extension 20 is similarly threadably connected to guide shaft 17 and secured in place by set screw 25.

Guide shaft 17 is marked off along its length with an accurately-engraved scale 26 divided into units of length in either the metric or English system, and slideably cooperates, through front collar 27, with hollow threaded shaft housing 28. Travel key 29 on guide shaft 17 is accommodated by keyway slot 30 cut along the upper portion of shaft housing 28. Bias spring 31 abuts travel key 29, as shown in FIG. 3, and serves to urge said key toward front collar 27. Zero-adjustment nut 32, threadably mounted on shaft housing 28, acts as a stop for travel key 29, since tab 29a extends through keyway slot 30 to contact nut 32, while locknut 33 holds zero adjustment nut 32 firmly in place. Spring tension is controlled by tension adjusting screw 34, threadably inserted through rear collar 35, having spring retaining ring 36 mounted thereon, as shown in FIG. 3. As screw 34 is threaded into collar 35, retaining ring 36 compresses spring 31, increasing spring tension while at the same time increasing the resistance to movement of travel key 29 along keyway slot 30. Depth adjustment nut 37 and lock nut 38, threadably mounted on shaft guide 28, act as a rearward limit for movement of travel key 29 by similarly contacting tab 29a.

Shaft housing 28 and its associated components are positioned and supported by housing 39 and front and rear supports 40 and 41 respectively. Arcuate slots 42 and 44 and adjusting screws 43 and 45 adjustably fasten front support 40 and rear support 41 to housing 39 to enable shaft housing 28 to be aligned parallel to the axis of the drill used. Mounting straps 46 are provided with a series of holes 47 which fit over guide pegs 48 on housing bracket 49, making the housing axially positionable and thus universally attachable to drills of various manufacture and design.

Drilling holes of accurately pre-set depth first requires that the drill guide be zero-adjusted for the type of drill and the length of bit used. Guide foot 12 is placed on the stock 51 to be drilled, and as pressure is applied to the drill, guide shaft 17, biased by spring 31, is forced into shaft housing 28 until drill bit 50 contacts stock 51. While the drill is thus being held, zero-adjusting nut 32 is threaded along shaft housing 28 until it contacts travel key 29. This prevents spring 31 from urging guide shaft 17 back to its original position. Lock nut 33 is then threaded snugly against zero-adjusting nut 32 to hold it firmly in place. Using depth scale 26 as a measure, guide foot 12 is then hand-pushed until it has traveled the desired depth of the hole, forcing travel key 29 even further into shaft housing 28. The drill operator then threads depth adjustment nut 37 along shaft housing 28 until it reaches the final position of travel key 29. Lock nut 38 is then threaded snugly against depth adjustement nut 37 to firmly hold it in place. The drill guide is now zeroed and ready for use.

FIGS. 4 and 7 are top and side views, respectively, of a zero-adjusted drill. Travel key 29 is limited in its travel to distance D, i.e., the distance it can travel along slot 30 until tab 29a encounters depth adjustment nut 37. Thus, when travel key 29 has reached its maximum travel D, drill bit 50 has penetrated the identical distance D into stock 51. In this manner, my invention may be adjusted to compensate for variations in drill bit length or the different housing designs of various commercially-used drills to provide an accurate, easy-to-use hole depth guide. Accuracy in setting hole depth may be increased by using a finer threading on shaft housing 28, thus affecting the distance each adjusting nut will travel along said shaft per revolution.

Guide foot 12, as illustrated in FIGS. 4 and 5, is specifically designed to allow for accurate drilling of substantially round or cylindrical work stock, embracing such stock against non-slip, non-scuff material 52 permanently affixed along the faces of the guide foot. To allow drilling of larger diameter stock, extenders 53 may be fastened to guide foot 12 as shown in FIG. 1. Extenders 53 are provided with non-skid, non-scuff pads 54, similar to pads 52 used on guide foot 12. Adjusting screw 55 allows guide foot 12 to be moved along slot 56, adjusting for clearance between the guide foot and drill 50.

For use with flat stock, guide platform 57, as shown in FIG. 9, is removably interchangeable with guide foot 12. Bracket 61 allows attachment of platform 57 to mounting bracket 13, while threaded tabs 62 accommodate handle 15. Slot 58 accommodates drill bit 50, while insert 58a, shown in phantom at FIG. 9, narrows slot 58 to allow end drilling of small diameter stock as, for example, dowel rods.

Both the guide foot 12 and the guide platform 57 are adjustable for drilling at various angles to stock by swivel bracket 14. Angle adjusting screw 59 allows swivel bracket 14 to be adjusted pivotally about scale 60, which is graduated in degrees. When the desired angle is set, angle adjusting screw 59 is tightened, holding swivel bracket 14 firmly in place, as seen in FIG. 6, until drilling is complete.

The embodiment of my invention described above is removably attachable to, and universally adjustable for, use with any standard, hand-held portable drill. FIGS. 7 and 8 illustrate how my invention might appear adapted as an integral feature of a drill. Mounting straps 46 would then, of course, be unnecessary, since housing 39 could be molded directly onto drill 10. Such an integral version, designed specifically to fit a certain drill, might well obviate the necessity for the universal adjustability afforded by offset elbow 19. In that event, a simple, straight shaft 63 could then be used, as shown in FIGS. 7 and 8 being used in conjunction with guide platform 57 for drilling flat work stock.

Nuts 32 and 33 may be provided with slots to allow the removal of guide shaft 17 when the drill guide is not needed.

It is to be understood that the above description is by way of example only, and is not intended as a limitation on the scope of my invention.

I claim:

1. A universal drill guide for portable, hand-held drills comprising:
   housing means,
   said housing means being removably and adjustably attachable to a portable hand-held drill;
   externally threaded hollow guide means,
   said guide means being aligned and supported by said housing means;
   platform means,
   axially and transversely adjustable shaft means with respect to said platform means and slidably cooperating with said guide means;
   spring bias means,
   said spring bias means being surrounded and enclosed by said guide means, and contacting said shaft means,
   said spring bias means urging said shaft means to slidably extend from said guide means;
   stop means,
   said stop means being threaded on said external threads of said guide means,
   said stop means adapted to contact said shaft means, thus selectively limiting the slidable movement of said shaft means in said guide means.

2. The apparatus as recited in claim 1 wherein:
   said housing means is removably attachable by strap means having therein a plurality of apertures laterally spaced along substantially the entire length of said strap means,
   said apertures cooperating with a plurality of tabs aligned in a direction parallel to the axis of rotation of a drill bit used in said drill.

3. The apparatus as recited in claim 1 wherein:
   said housing means comprises side panels, a front panel, and a rear panel,
   said side panels held to said front panel and said rear panel by fasteners threaded into said front panel and said rear panel through arcuate slots in said side panels,
   said front panel and said rear panel being adjustably positionable with respect to said side panels.

4. The apparatus as recited in claim 1 wherein:
   said guide means is a hollow substantially cylindrical rod,
   said rod being threaded along substantially its entire length, and
   said rod having formed therein a slot extending along its length.

5. The apparatus as recited in claim 4 wherein:
   said shaft means has a key at one end, and wherein said key is slidably engaged in said slot when said shaft is coaxially slidably engaged with said guide means.

6. The apparatus as recited in claim 1 wherein each of said stop means comprises:
   a threaded adjusting collar, and a threaded locking collar to prevent movement of said adjusting collar.

7. The apparatus as recited in claim 1 wherein:
said adjustable shaft means comprises a main shaft, elbow means, and bracket means,
said main shaft slidably cooperating with said guide means,
said bracket means terminating at said platform means,
said elbow means connecting said main shaft and said bracket means, and
said elbow means being threadably adjustable to reposition said bracket means transversely with respect to said main shaft and axially along said main shaft.

8. The apparatus as recited in claim 1 wherein:
said platform means is of a substantially V-shape to accommodate convex work stock.

9. The apparatus as recited in claim 1 wherein:
said platform means is faced with a non-skid, non-mar resilient material.

10. The apparatus as recited in claim 8 wherein:
extenders may be Removably fastened to said platform means to accommodate work stock of large diameters.

11. The apparatus as recited in claim 1 wherein:
handle means is attached to said platform means.

12. The apparatus as recited in claim 11 wherein:
said handle means is removably and angularly adjustable to fit opposing sides of said platform means.

13. A universal drill guide for portable hand-held drills comprising:
a housing means aligning and supporting hollow, substantially cylindrical guide means,
said guide means being threaded externally along substantially its entire length,
said guide means having a slot formed axially along its length,
a main shaft having a key at one end,
said main shaft slidably cooperating with said guide means such that said key slidably cooperates with said slot,
spring bias means positioned coaxially within said guide means, with one end of said spring bias means abutting closure means at one end of said guide means and the other end of said spring bias means abutting said key,
said spring bias means thus urging said key and thus said main shaft axially along said slot toward the work stock to be drilled,
stop means threadably adjustable axially along said guide means to act as stops limiting the travel of said key along said slot,
elbow means adjustably attachable to the end of said main shaft opposite the end of said main shaft having said key formed thereon,
bracket means threadably cooperating with said elbow means and terminating in removably attached platform means.

14. The apparatus as recited in claim 13 wherein:
said platform means is angularly adjustable for drilling at various angles.

15. The apparatus as recited in claim 13 wherein:
said platform means is of substantially a V-shape to accommodate convex work stock.

16. The apparatus as recited in claim 15 wherein;
said platform means is faced with non-skid, non-mar resilient material.

17. The apparatus as recited in claim 15 wherein:
extender means are removably attachable to said platform means to accommodate work stock of large diameters.

18. The apparatus as recited in claim 13 wherein:
said platform means is transversely adjustable with respect to said bracket means.

19. The apparatus as recited in claim 13 wherein:
said closure means comprises a collar having formed therein a threaded aperture,
said aperture receiving therethrough a threaded fastener,
said threaded fastener abutting said spring bias means, thereby adjusting the compressive force exerted on said spring bias means.

20. The apparatus as recited in claim 13 wherein:
handle means is attached to said platform means.

21. The apparatus as recited in claim 20 wherein:
said handle means is removably and angularly adjustable to fit opposing sides of said platform means.

22. A drill guide for portable hand-held drills comprising:
a housing formed as an integral part of a portable hand-held drill,
said housing aligning and supporting hollow, substantially cylindrical guide means,
said guide means being threaded externally along substantially its entire length,
said guide means having a slot formed axially along its length,
a main shaft having a key at one end,
said main shaft slidably cooperating with said guide means such that said key slidably cooperates with said slot,
spring bias means positioned coaxially within said guide means, with one end of said spring bias means abutting closure means at one end of said guide means and the other end of said spring bias means abutting said key,
said spring bias means thus urging said key and thus said main shaft axially along said slot toward the work to be drilled,
stop means threadably adjustable axially along said guide means to act as stops limiting the travel of said key along said slot by contacting said key, and
bracket means threadably cooperating with said main shaft and terminating in removably attached platform means.

23. The apparatus as recited in claim 22 wherein:
said bracket means comprises elbow means.

24. The apparatus as recited in claim 23 wherein:
said elbow means is axially and transversely adjustable with respect to said main shaft.

25. The apparatus as recited in claim 22 wherein:
said closure means comprises a collar having formed therein a threaded aperture,
said aperture receiving therethrough a threaded fastener,
said threaded fastener abutting said spring bias means, thereby adjusting the compressive force exerted on said spring bias means.

26. The apparatus as recited in claim 22 wherein:
said platform means is angularly adjustable for drilling at various angles.

27. The apparatus as recited in claim 22 wherein:
said platform means is of substantially a V-shape to accommodate convex work stock.

28. The apparatus as recited in claim 22 wherein:
said platform means is faced with non-skid, non-mar resilient material.

29. The apparatus as recited in claim 22 wherein said stop means further comprises means to selectively removably retain said shaft within said guide means.

* * * * *